United States Patent [19]
Chen et al.

[11] Patent Number: 5,940,477
[45] Date of Patent: Aug. 17, 1999

[54] TELEPHONE ANSWERING APPARATUS WITH ANSWER-ONLY OPERATION

[75] Inventors: Jyh-Young Chen, Miaoli; Tang-Chief Chu, Jaw-Nan Li, both of Taiwan

[73] Assignee: United Microelectronics Corp., Taiwan

[21] Appl. No.: 08/712,404

[22] Filed: Sep. 11, 1996

[51] Int. Cl.⁶ ................................................. H04M 1/64
[52] U.S. Cl. ................................................. 379/88.16; 379/82
[58] Field of Search ................... 379/67, 70, 79, 379/82, 88, 350, 372, 377, 380, 387, 419, 67.1, 71, 72, 76, 88.16, 88.19, 88.22, 142

[56] References Cited

U.S. PATENT DOCUMENTS

| | | | |
|---|---|---|---|
| 4,227,053 | 10/1980 | Jacobson | 379/67 |
| 4,304,968 | 12/1981 | Klausner et al. | 379/67 |
| 4,390,752 | 6/1983 | Jacobson | 379/67 |
| 4,536,624 | 8/1985 | Lyle | 379/67 |
| 4,691,344 | 9/1987 | Brown et al. | 379/106 |
| 4,720,847 | 1/1988 | Giardina | 379/88 |
| 5,029,202 | 7/1991 | Doernbach, Jr. et al. | 379/201 |
| 5,608,792 | 3/1997 | Laidler | 379/386 |

*Primary Examiner*—Scott Weaver
*Attorney, Agent, or Firm*—Rabin & Champagne, P.C.

[57] ABSTRACT

A telephone answering apparatus with answer-only. The telephone answering apparatus includes a converter for converting the ringing signal to a DC voltage which is used to power the telephone answering apparatus. A ring signal detector is devised to detect the presence of the ringing signal to thereby generate an actuating signal when the presence of the ringing signal is detected. Responsive to the actuating signal, a dial IC retrieves pager numbers or voice messages prerecorded in a speech synthesizer IC and sends the retrieved voice message via the telephone system to the caller.

18 Claims, 7 Drawing Sheets

TELEPHONE ANSWERING APPARATUS WITH ANSWER-ONLY OPERATION

BACKGROUND OF THE INVENTION

1. Field of the Invention

This invention relates to telephone systems, and more particularly, to a telephone answering apparatus which can be installed at a receiving end of a telephone system for answer-only operation of prerecorded voice messages.

2. Description of the Related Art

A telephone answering machine is an electronic device which can be attached to a telephone for automatically answering calls with prerecorded messages and recording the caller's messages for later playback. Conventional telephone answering machines, albeit more powerful in function, are complex in circuit structure, which causes manufacturing costs to be high. For instance, the UM9701 telephone answering system manufactured by the United Microelectronics Corporation (UMC) of Taiwan, ROC, is capable of prerecording a lengthy record of voice data, but it is quite complex in circuit structure and thus is costly to manufacture. In many telephone answering applications, such as in a corporation central office, the recording of the caller's message is usually not necessary.

Therefore, a telephone answering apparatus with answer-only operation would greatly simplify the circuit structure and save manufacturing costs, therefore increasing competitiveness in the market.

SUMMARY OF THE INVENTION

It is therefore an object of the invention to provide a telephone answering apparatus with answer-only operation.

It is another object of the invention to provide a telephone answering apparatus which is comparatively simple in circuit structure, and therefore has lower manufacturing cost thereof for increased competitiveness in the market.

In accordance with the foregoing and other objects of the invention, a new and improved telephone answering apparatus is provided. The telephone answering apparatus includes a receiving means for receiving a ringing signal, a means, responsive to the ringing signal, for providing to a DC voltage which is used to drive the telephone answering apparatus, and a detecting means for detecting the presence of the ringing signal. The detecting means generates an actuating signal when the presence of the ringing signal is detected. Also provided are a means, responsive to the actuating signal, for generating a plurality of trigger signals, and a speech synthesizer means, responsive to the trigger signals, for retrieving voice messages prerecorded therein and sending the retrieved voice message via the telephone system to the caller.

BRIEF DESCRIPTION OF THE DRAWINGS

The invention can be more fully understood from the following detailed description of the preferred embodiments, with reference to the accompanying drawings, wherein.

DETAILED DESCRIPTION OF PREFERRED EMBODIMENTS

Figure 1:
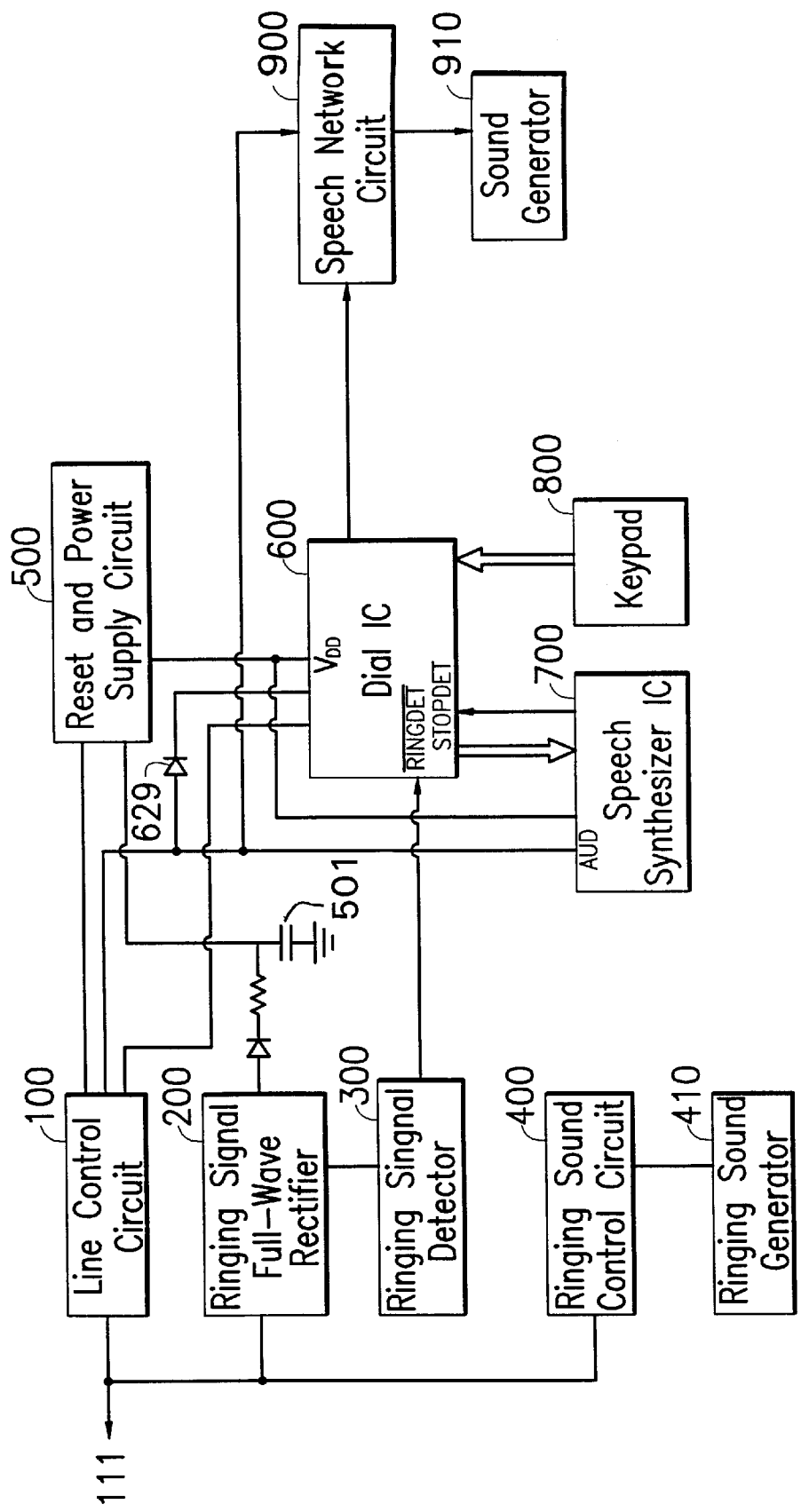
FIG. 1 is a schematic block diagram of a preferred embodiment of the telephone answering apparatus according to the invention.

FIG. 1 shows a schematic block diagram of a preferred embodiment of the telephone answering apparatus according to the invention, which is composed of a line control circuit 100 connected to a telephone line 111, a ringing signal full-wave rectifier 200, a ringing signal detector 300, a ringing sound control circuit 400, a ringing sound generator 410 (which can be a speaker or a buzzer), a reset and power supply circuit 500, a dial IC 600, a speech synthesizer IC 700, a keypad 800, a speech network circuit 900, and a sound generator 910.

The line control circuit 100 is used to control the input/output operation of the telephone answering apparatus in response to any incoming telephone signal via the telephone line 111 and outputs from the dial IC 600 and speech synthesizer IC 700. The reset and power supply circuit 500 is controlled by the line control circuit 100, and supplies power to the portions of the telephone answering apparatus that require power, i.e., the dial IC 600 and the speech synthesizer IC 700 as shown in FIG. 1. When an incoming telephone signal is received via the telephone line 111, it is delivered both to the ringing sound control circuit 400 and the ringing signal full-wave rectifier 200. The ringing sound control circuit 400, upon receiving the ringing signal, activates the ringing sound generator 410 for audible reproduction of the ringing signal, so as to notify any persons nearby of the incoming phone call. The telephone answering apparatus is devised in such a way that if nobody answers the phone call by picking up a handset of the telephone system by a preset number of cycles of ringing, for example four, the telephone answering apparatus will retrieve the call and send prerecorded voice messages via the telephone line 111 to the caller. This task is carried out by the ringing signal full-wave rectifier 200, ringing signal detector 300, dial IC 600, and speech synthesizer IC 700 in combination.

Figure 2:
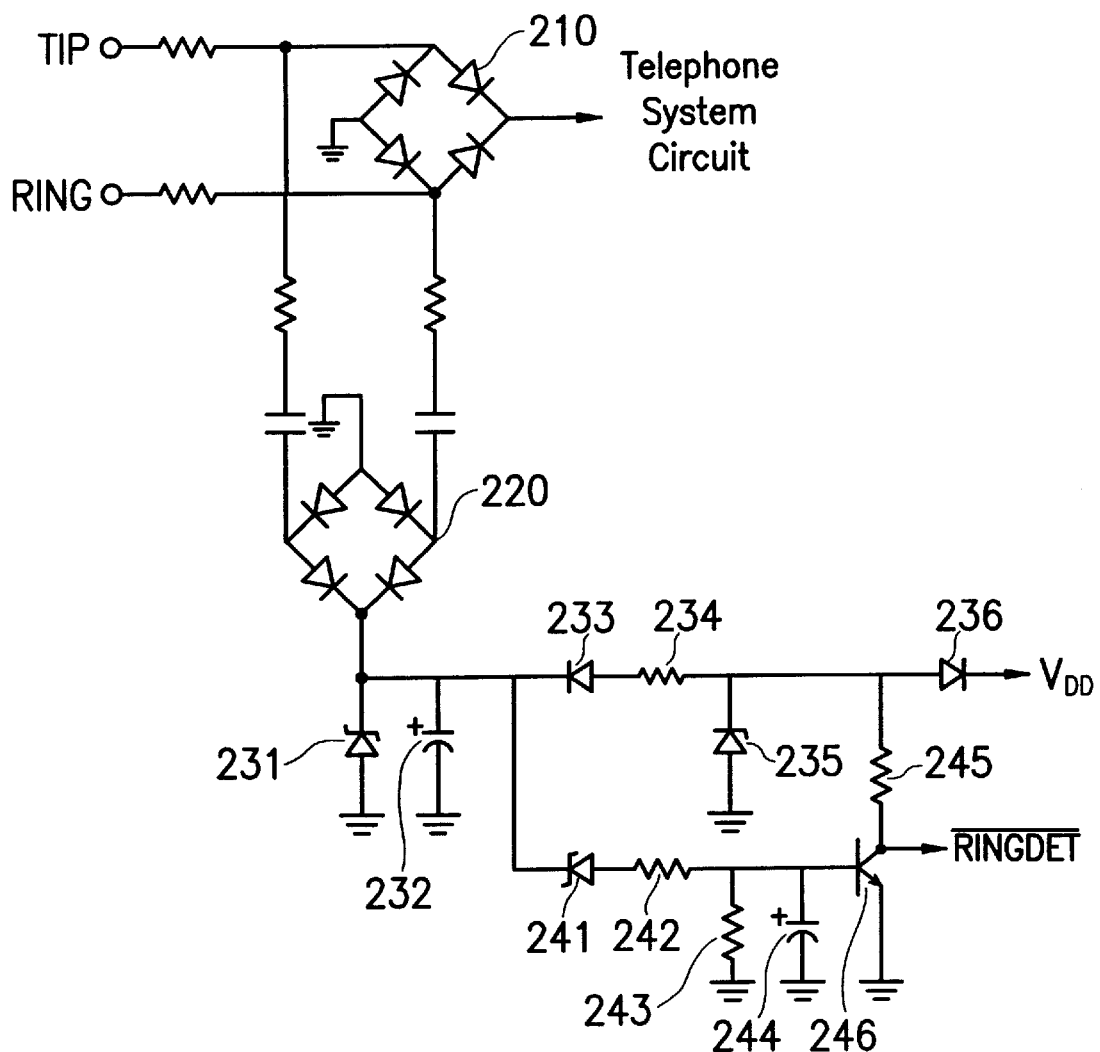
FIG. 2 is a circuit diagram of a ringing signal full-wave rectifier and a ring detector utilized in the telephone answering apparatus of FIG. 1.

FIG. 2 shows the circuit structure of the ringing signal full-wave rectifier 200 and ringing signal detector 300 in combination, including a first bridge circuit 210 and a second bridge circuit 220, both of which are used for full-wave rectifying of the incoming ringing signal. The output of the first bridge circuit 210 is sent to the telephone system for other purposes, while the output (denominated as $V_L$) of the second bridge circuit 220 is further processed by a circuit block including a first tunnel diode 231, a capacitor 232, a diode 233, a resistor 234, a tunnel diode 235, a diode 236, a tunnel diode 241, a resistor 242, a resistor 243, a capacitor 244, a resistor 245, and a transistor 246. Through this circuit block, the DC component in the output $V_L$ is extracted and clamped substantially at a predetermined fixed level. As a result, the output of the diode 236 is substantially a DC voltage which is sent to the reset and power supply circuit 500. The reset and power supply circuit 500 provide a DC voltage to serve as the operating voltage (i.e., $V_{DD}$) of the telephone answering apparatus, i.e., the dial IC 600 and the speech synthesizer IC 700 as shown being coupled to the reset and power supply circuit 500 in FIG. 1. $V_{DD}$ is maintained by capacitor 501 which is illustrated being coupled between the ringing signal full-wave rectifier 200, the reset and power supply circuit 500, and Ground in FIG. 1. The reset and power supply circuit 500 is coupled to the line control circuit 100 as shown in FIG. 1, and thus continually provides $V_{DD}$ to the telephone answering apparatus while the telephone answering system is receiving an incoming call. At the same time, the output at the collector of the transistor 246 is taken as an actuating signal, referred to here as $\overline{\text{RINGDET}}$, which is used to inform the dial IC 600 of the presence of a ringing signal to the telephone answering apparatus.

Figure 3:
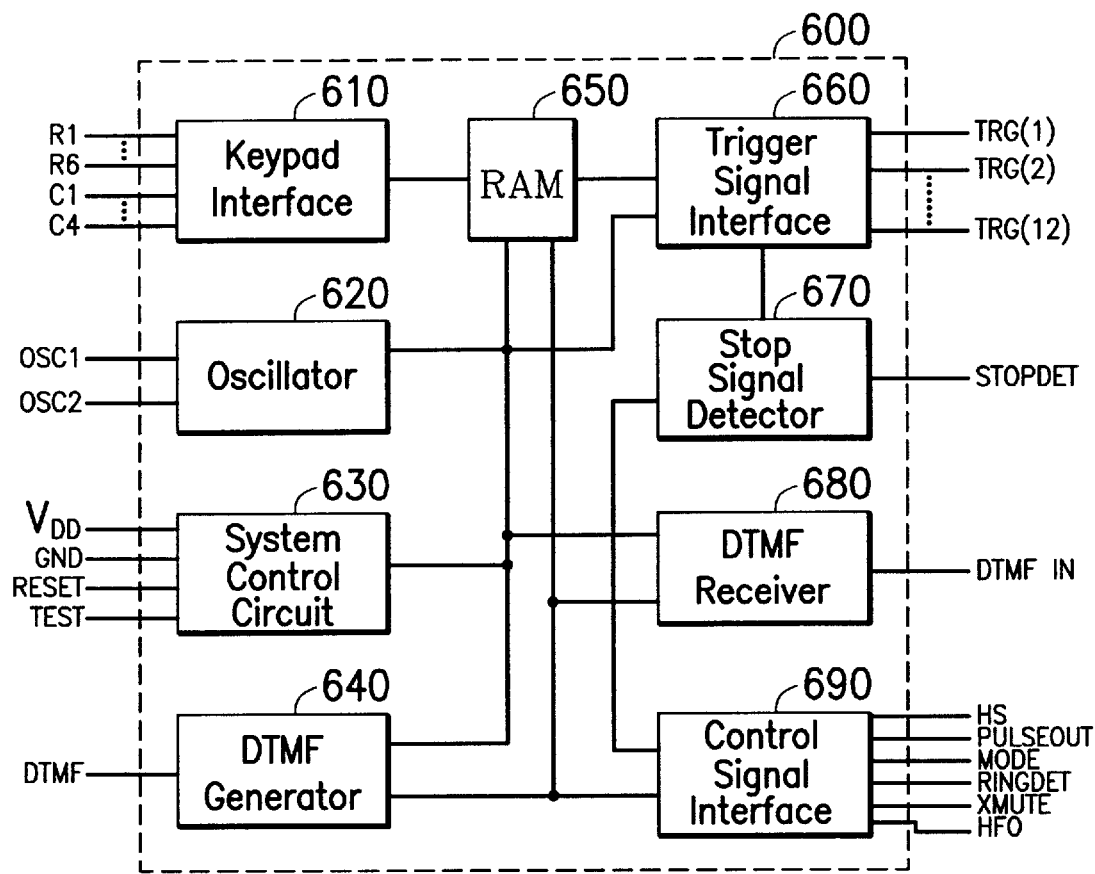
FIG. 3 is a block diagram of a dial IC utilized in the telephone answering apparatus of FIG. 1.

As shown in FIG. 3, the dial IC 600 is composed of a keypad interface 610, an oscillator 620, a system control circuit 630, a dual tone multiple frequency (DTMF) signal generator 640, a memory unit (RAM) 650, a trigger signal interface 660, a stop signal detector 670, a DTMF signal receiver 680, and a control signal interface 690. The functions of these elements may be described as follows: The keypad interface 610 serves as an interface for coupling the keypad 800 to the dial IC 600. The oscillator 620 provides oscillating frequencies to the telephone answering apparatus. The system control circuit 630 has four ports $V_{DD}$, GND, RESET, and TEST, respectively for connecting to the power source and for resetting and testing of the telephone answering apparatus. The DTMF signal generator 640 generates a DTMF signal which is transferred to a switchboard through the telephone line 111. The DTMF signal receiver 680 is used to receive the DTMF signal from the telephone line 111. The RAM 650 is used to store user-set telephone numbers and voice data settings. The trigger signal interface 660 is used to transfer a sequence of trigger signals as TRG(1), TRG(2), ... and TRG(12), for example, to the speech synthesizer IC 700 so as to retrieve corresponding pieces of voice data. The stop signal detector 670 is used to receive a stop signal STOPDET from the speech synthesizer IC 700. The control signal interface 690 has at least six ports HS, PULSEOUT, MODE, $\overline{\text{RINGDET}}$, $\overline{\text{XMUTE}}$, and HFO for inputting and outputting of associated control signals.

Figure 4:
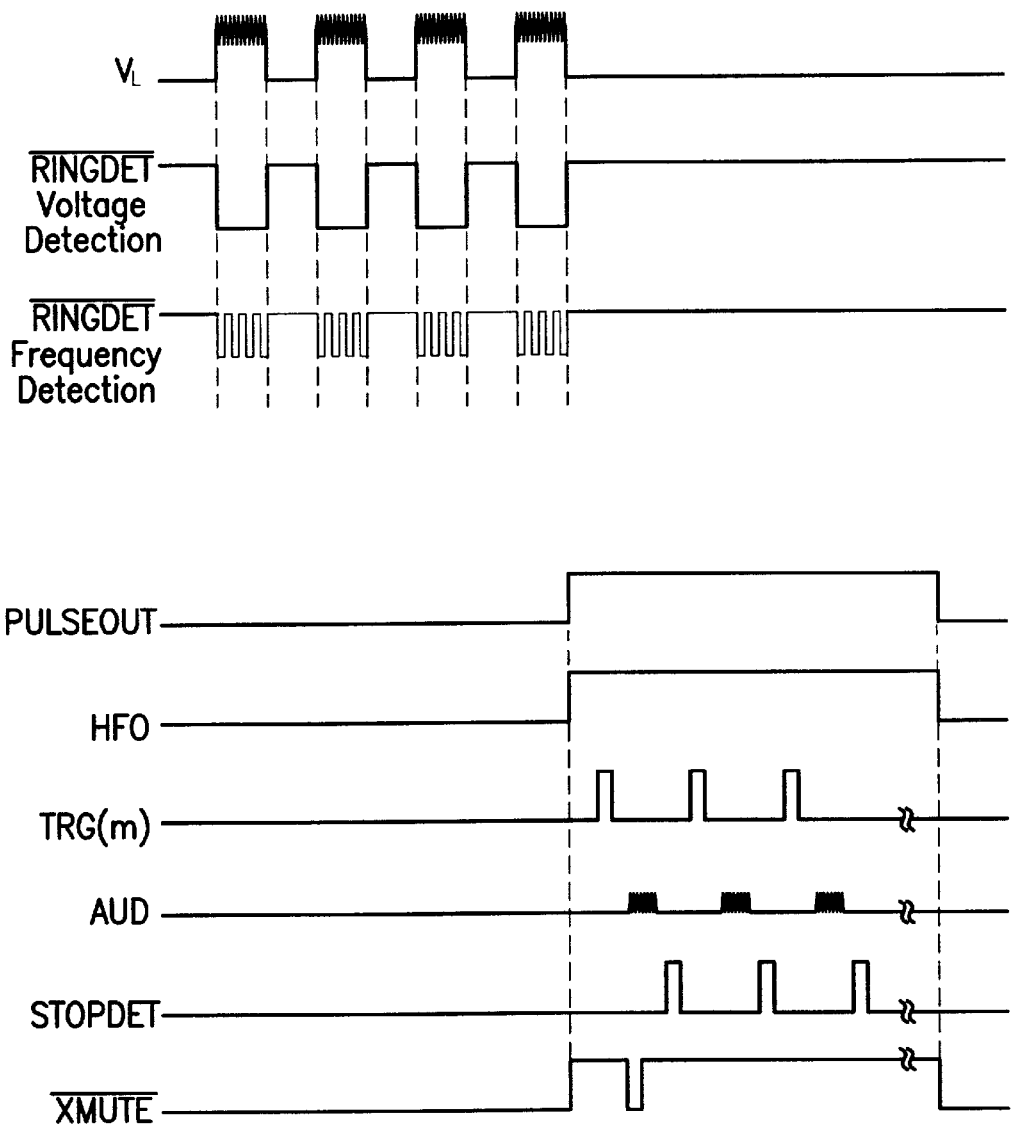
FIG. 4 is a waveform diagram of various signals in the telephone answering apparatus.

As shown in FIG. 4, the $\overline{\text{RINGDET}}$ signal can be either amplitude-based or frequency-based. In this embodiment, the dial IC 600 will be set to active mode after receiving a preset number of cycles of the ringing signal, for example four, as illustrated in FIG. 4. After receiving the $\overline{\text{RINGDET}}$ signal, the dial IC 600 functions with the speech synthesizer IC 700 to retrieve prerecorded voice messages in the speech synthesizer IC 700 and send them via the telephone line 111 to the caller. After entering the active mode, the PULSEOUT, HFO, TRG(m), m=1 ... 12, and $\overline{\text{XMUTE}}$ ports of the dial IC 600, and the AUD and STOPDET ports of the speech synthesizer IC 700 will send out waveforms as illustrated in FIG. 4.

In this embodiment, the speech synthesizer IC 700 stores 12 segments or pieces of prerecorded voice data including, for example, 10 pieces (units) of voice data of numbers to be dialed and 2 pieces of voice data of prerecorded messages. The messages can be, for example, "Hello, this is United Microelectronics Corporation ... " and "For operator service, please dial ... ". The dial IC 600 can be preprogrammed by the user to allow retrieval of desired data in these segments. Further, the user can preset the numbers of his/her personal phone sets, such as mobile phones or pagers, in the dial IC 600. This is done by means of the keypad 800, which includes a number of keys for the user to key in numbers or settings to the dial IC 600. The dial IC 600 is coupled via the keypad interface 610 to the keypad 800. The keypad interface 610 and the keypad 800 are both conventional circuits and so no further details or explanation is required here.

The trigger signal interface 660 and stop signal detector 670 both serve as interfaces between the dial IC 600 and the speech synthesizer IC 700. The trigger signal interface 660 includes a number of output trigger signals TRG(1), TRG(2), ..., TRG(12), each of which is used to access one of the 12 segments in the speech synthesizer IC 700. For example, if signal TRG(m) is sent to the speech synthesizer IC 700, the data stored in the (m)th segment is accessed. The issuance of the trigger signals can be preprogrammed by the user. When the speech synthesizer IC 700 completes the outputting of data in a selected segment, it issues the STOPDET signal which will be detected by the stop signal detector 670 in the dial IC 600. Upon receiving the STOPDET signal, the dial IC 600 issues the next trigger signal, if any, as the waveform shown in FIG. 4, to the speech synthesizer IC 700 so as to retrieve a subsequent piece of data in another segment. This process repeats until all the trigger signals have been issued.

Figure 5:
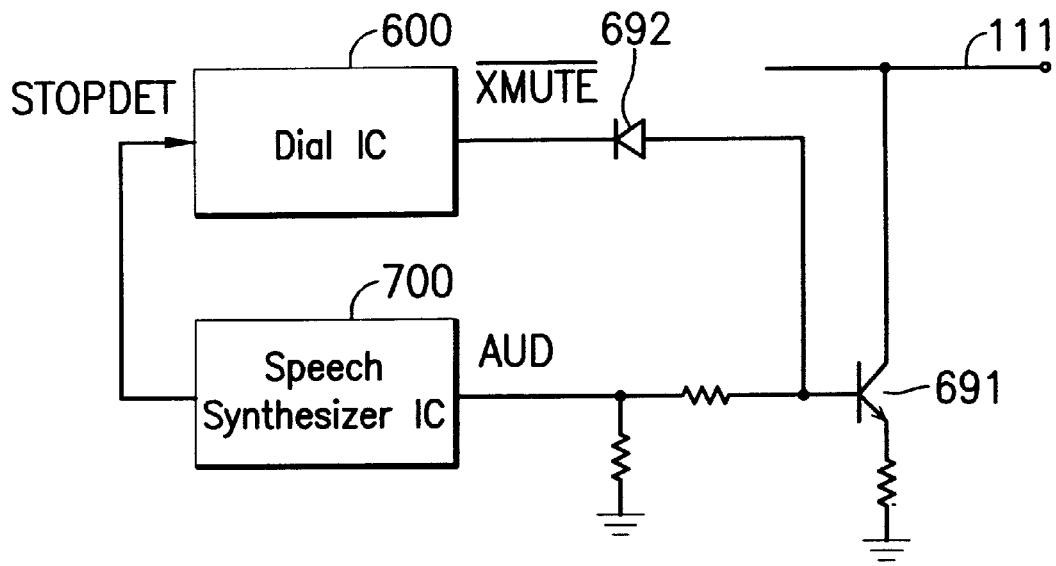
FIG. 5 is a schematic circuit diagram used to depict how prerecorded voice messages are outputted to a telephone line.
Figure 6:
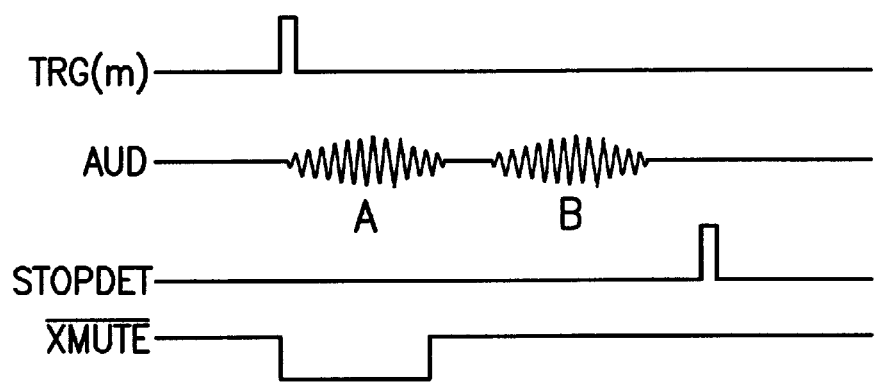
FIG. 6 is a waveform diagram of various signals in the circuit of FIG. 5.

As shown in FIG. 5, the AUD port of the speech synthesizer IC 700 is coupled via a transistor 691 and a diode 692 (see FIG. 1) to the telephone line 111. When the speech synthesizer IC 700 sends out the voice data in a selected segment via the AUD port, the AUD signal includes two packets of data respectively labeled as A and B as shown in FIG. 6. The dial IC 600 can be preprogrammed to issue the $\overline{\text{XMUTE}}$ selection signal to select one of the packets A or B as the output to the telephone line 111. In this embodiment, when the $\overline{\text{MUTE}}$ selection signal is a low voltage, it disables the AUD output, whereas when the $\overline{\text{MUTE}}$ selection signal is a high voltage, it enables the same. As a result, in the example shown in FIG. 6, the first packet of voice data A is disregarded while the second packet of voice data B is selected as the output to the telephone line 111. As shown in FIG. 5, the AUD signal is amplified by the transistor 691 and then sent to the telephone line 111 which subsequently transmits the voice message to the caller. Referring back to FIG. 1, at the same time, the AUD signal is also transferred to the speech network circuit 900 which drives the sound generator 910 (which is a speaker in this embodiment) to reproduce the voice message in the AUD signal.

Figure 7:
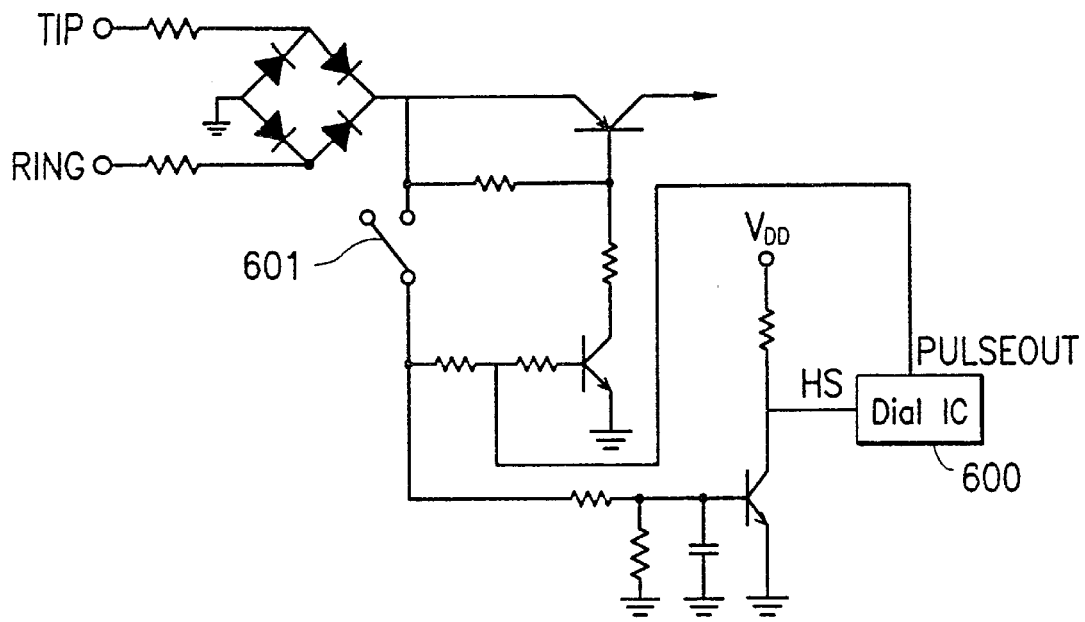
FIG. 7 is a schematic circuit diagram used to depict the generation of an inhibit signal when a handset connected to the telephone answering apparatus is picked up by the user.
Figure 8:
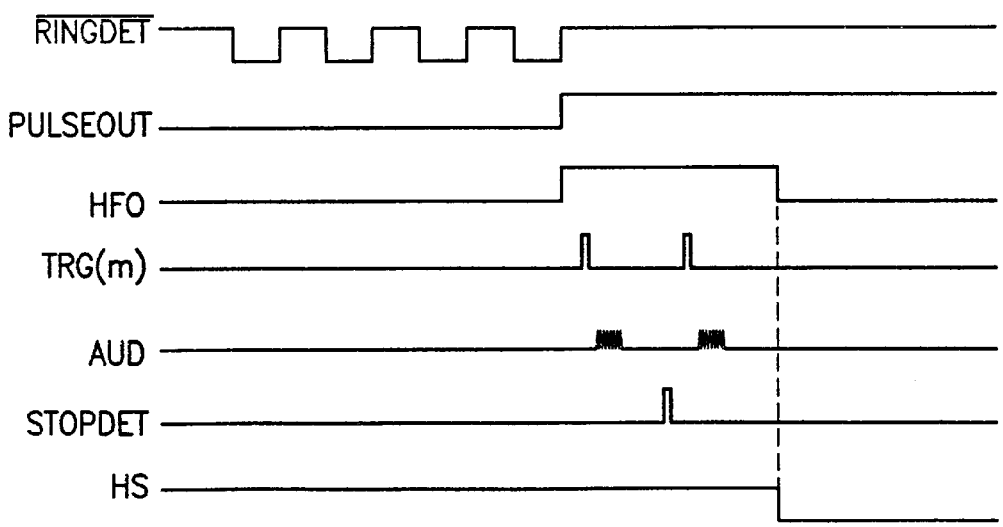
FIG. 8 is a waveform diagram of various signals in the telephone answering apparatus of FIG. 1 when the handset is picked up.

Referring to FIG. 7, if the handset is picked up when the voice message is transferred, switch 601 remains in the ON position. This will in turn cause the dial IC 600 to terminate the transferring of the voice message, as illustrated in FIG. 8, thus inhibiting the issuance of the trigger signals TRG(m), m=1 ... 12 from the dial IC 600 to the speech synthesizer IC 700. This action then terminates the output of the AUD signal from the speech synthesizer IC 700, as illustrated in FIG. 8.

Figure 9:
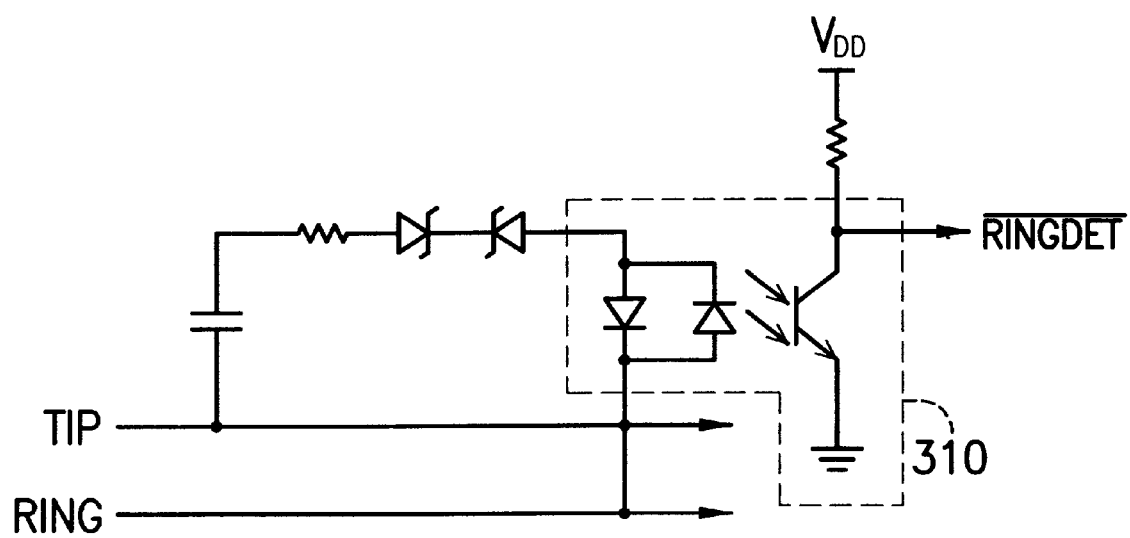
FIG. 9 is a circuit diagram of another embodiment of the ringing signal detector utilized in the telephone answering apparatus of FIG. 1.

In the foregoing embodiment, the dial IC 600 is powered by the DC voltage obtained by conversion from the ringing signal, and thus needs no external power source to drive it. In another embodiment as shown in FIG. 9, an external power source, such as a battery, is used instead to drive the dial IC 600, and thus a photocoupler (also called an optocoupler or optoisolator) can be used to obtain the $\overline{\text{RINGDET}}$ signal.

Referring back to FIG. 3, the user can control the telephone answering apparatus by the way of sending the DTMF signal by operating another telephone set to the DTMF signal receiver 680 in the dial IC 600. By means of this, the user can use the external telephone set to key in numbers in DTMF signal or settings to the dial IC 600. The DTMF receiver 680 will store the key-in data in a 4-bit format in the RAM 650. Further, when the dial IC 600 is on-line, the user can request the caller to dial in his/her phone number, allowing the user to know where the incoming call is initiated. These latter functions are conventional techniques so that description thereof will not be further detailed.

It is an advantage of the invention that the dial IC 600 and the speech synthesizer IC 700 are both powered by voltage $V_{DD}$, which is obtained from the ringing signal in the incoming telephone signal, allowing the telephone answering apparatus to save power consumption from external sources. When there is no incoming call, the dial IC 600 and speech synthesizer IC 700 consume no power from the telephone system power source.

The invention has been described using exemplary preferred embodiments. However, it is to be understood that the scope of the invention is not to be limited to the disclosed preferred embodiments. To the contrary, it is intended to cover various modifications and similar arrangements as would be apparent to those skilled in the art. The scope of the claims should be accorded the broadest interpretation so as to encompass all such modifications and similar arrangements.

What is claimed is:

1. An answer-only telephone answering apparatus, for installation at a receiving end of a telephone system which plays a prerecorded voice message in response to a ringing signal from a calling end of the telephone system, said apparatus comprising:
   (a) receiving means for receiving the ringing signal;
   (b) means, responsive to the ringing signal, for generating a DC voltage, wherein the DC voltage is provided to portions of the telephone answering apparatus requiring power;
   (c) means for detecting the ringing signal and generating an actuating signal in response to the detection of the ringing signal;
   (d) means, responsive to the actuating signal, for generating a plurality of trigger signals;
   (e) speech synthesizer means, responsive to the trigger signals, for retrieving a plurality of voice data units prerecorded therein, each of the voice data units associated with a respective one of the plurality of trigger signals, and for transmitting the retrieved voice data units via the telephone system to the calling end; and
   (f) controlling means, coupled to said trigger signals generating means and said speech synthesizer means, for controlling the transmission of the retrieved voice data units from said speech synthesizer means to the calling end.

2. The telephone answering apparatus of claim 1, wherein said means for generating a DC voltage includes a first bridge circuit and a second bridge circuit connected in parallel and having a common ground, said first bridge circuit and said second bridge circuit providing full-wave rectification of the ringing signal.

3. The telephone answering apparatus of claim 1, wherein the prerecorded voice data units include telephone numbers and voice messages.

4. The telephone answering apparatus of claim 3, wherein the prerecorded voice data units include at least two packets of voice data, wherein the controlling means selects only one of the at least two packets for transmission via the telephone system to the calling end at any one time.

5. The telephone answering apparatus of claim 4, wherein said controlling means comprises:
   a transistor having a base coupled to said speech synthesizer means, said transistor amplifying the retrieved voice data units from said speech synthesizer means; and
   a diode coupled between said trigger signals generating means and the base of said transistor.

6. The telephone answering apparatus of claim 4, wherein said speech synthesizer means is responsive to completion of the transmission of each of the retrieved voice data units to transmit a stop signal to said trigger signals generating means, said trigger signals generating means being responsive to the stop signal to transmit a further one of the trigger signals to the speech synthesizer means.

7. The telephone answering apparatus of claim 4, further comprising means, responsive to an incoming call being answered at the receiving end of the telephone system, for transmitting an inhibit signal to said trigger signals generating means, said trigger signals generating means being responsive to the inhibit signal to terminate generation of the plurality of trigger signals.

8. The telephone answering apparatus of claim 1, wherein said trigger signals generating means includes keypad interface means for connection to a keypad which is external to the telephone answering apparatus, said keypad interface means enabling a user to input data settings to said trigger signals generating means via the external keypad.

9. The telephone answering apparatus of claim 1, wherein said trigger signals generating means includes means, connected to the receiving end of the telephone system, for receiving dual tone multiple frequency signals, thereby to enable data settings to be input to the trigger signals generating means from the calling end of the telephone system.

10. The telephone answering apparatus of claim 1, wherein said detecting means includes a photocoupler for obtaining the actuating signal.

11. The telephone answering apparatus of claim 9, wherein said data settings include telephone numbers and voice data.

12. The telephone answering apparatus of claim 8, wherein said data settings include telephone numbers and voice data.

13. The telephone answering apparatus of claim 1, wherein the means for generating a DC voltage also maintains the DC voltage.

14. The telephone answering apparatus of claim 13, wherein the DC voltage is provided to the portions of the telephone answering apparatus requiring power while the telephone answering apparatus is receiving an incoming call.

15. An answer-only telephone answering apparatus, comprising:
   (a) means for receiving a ringing signal;
   (b) means, responsive to the ringing signal, for generating a plurality of trigger signals, each of the trigger signals being associated with a respective one of a plurality of voice data units; and
   (c) means, having each of the voice data units prerecorded therein, and being responsive to each trigger signal, for retrieving the voice data units associated therewith, and for transmitting the retrieved voice data unit via the telephone system to the calling end.

16. The telephone answering apparatus of claim 15, further comprising means, responsive to the ringing signal, for generating a DC voltage, wherein the DC voltage is provided to portions of the telephone answering apparatus requiring power.

17. The telephone answering apparatus of claim 16, wherein the means for generating a DC voltage also maintains the DC voltage.

18. The telephone answering apparatus of claim 17, wherein the DC voltage is provided to the portions of the telephone answering apparatus requiring power while the telephone answering apparatus is receiving an incoming call.

* * * * *